US011104518B2

United States Patent
Koenigsknecht et al.

(10) Patent No.: US 11,104,518 B2
(45) Date of Patent: Aug. 31, 2021

(54) REMOTE HOPPER SYSTEM

(71) Applicant: Freeosk, Inc., Chicago, IL (US)

(72) Inventors: Tony Lee Koenigsknecht, Chicago, IL (US); Peter Jonathan Resnick, Chicago, IL (US); Albert John Kohn, Chicago, IL (US); Stephen Joseph Koza, Chicago, IL (US); Robert Dean Chadderdon, Chicago, IL (US); Michael Adam Jones, Chicago, IL (US)

(73) Assignee: Freeosk, Inc., Chicago, IL (US)

( * ) Notice: Subject to any disclaimer, the term of this patent is extended or adjusted under 35 U.S.C. 154(b) by 110 days.

(21) Appl. No.: 16/293,881

(22) Filed: Mar. 6, 2019

(65) Prior Publication Data

US 2019/0276237 A1 Sep. 12, 2019

Related U.S. Application Data

(60) Provisional application No. 62/639,717, filed on Mar. 7, 2018.

(51) Int. Cl.
*B65G 1/16* (2006.01)
*B65G 33/02* (2006.01)
*B65G 11/18* (2006.01)

(52) U.S. Cl.
CPC .............. *B65G 1/16* (2013.01); *B65G 11/183* (2013.01); *B65G 33/02* (2013.01)

(58) Field of Classification Search
CPC ........ B65G 1/16; B65G 11/183; B65G 33/02; G07F 11/00; G07F 11/44; G07F 11/02; A47F 1/00

USPC ....................................................... 221/174
See application file for complete search history.

(56) References Cited

U.S. PATENT DOCUMENTS

| 2,304,484 | A | * | 12/1942 | Smith | G07F 11/32 |
| | | | | | 221/124 |
| 2,628,875 | A | * | 2/1953 | Ossanna, Jr. | G07F 11/32 |
| | | | | | 312/45 |
| 3,265,244 | A | * | 8/1966 | Brown | G07F 9/002 |
| | | | | | 221/103 |
| 3,341,065 | A | | 9/1967 | Schuldt et al. | |
| 3,690,511 | A | * | 9/1972 | Wigham | A01C 9/02 |
| | | | | | 221/174 |
| 3,938,700 | A | * | 2/1976 | Camp | G07F 11/32 |
| | | | | | 221/109 |
| 4,008,826 | A | * | 2/1977 | Carree | A01C 9/02 |
| | | | | | 221/13 |

(Continued)

FOREIGN PATENT DOCUMENTS

GB 2356190 5/2001

OTHER PUBLICATIONS

International Search Report and Written Opinion for PCT Application No. PCT/US2019/20913 dated May 8, 2019, 8 pages.

*Primary Examiner* — Rakesh Kumar
(74) *Attorney, Agent, or Firm* — Seyfarth Shaw LLP

(57) ABSTRACT

A dispensation system having a hopper that is located remote to the remainder of the dispensation system. The hopper can be located remote from a delivery system and a conveyor or other transmitting device can connect the hopper to the delivery system. The hopper can therefore be located in an area that is more accessible or less valued than the area in which the products or objects are dispensed, allowing a more efficient product distribution system.

20 Claims, 20 Drawing Sheets

(56) References Cited

U.S. PATENT DOCUMENTS

| | | | | |
|---|---|---|---|---|
| 5,080,256 A * | 1/1992 | Rockola | | G07F 11/34 |
| | | | | 193/2 A |
| 5,303,844 A * | 4/1994 | Muehlberger | | G07F 7/069 |
| | | | | 221/1 |
| 5,853,079 A * | 12/1998 | Ito | | H05K 13/028 |
| | | | | 198/395 |
| 6,155,455 A * | 12/2000 | Yajima | | G07F 9/02 |
| | | | | 221/130 |
| 6,325,588 B1 | 12/2001 | Nolin | | |
| 6,415,953 B1 * | 7/2002 | O'Brien | | G07F 11/32 |
| | | | | 221/196 |
| 8,099,981 B2 * | 1/2012 | Barklage | | C03B 3/023 |
| | | | | 65/136.1 |
| 8,579,153 B2 * | 11/2013 | Yuyama | | G07F 17/0092 |
| | | | | 221/130 |
| 9,460,446 B2 * | 10/2016 | Lupoli | | H04W 4/80 |
| 2009/0236200 A1 * | 9/2009 | Hallowell | | G07D 1/04 |
| | | | | 194/215 |
| 2012/0058835 A1 * | 3/2012 | Luciano, Jr. | | G01S 19/39 |
| | | | | 473/192 |
| 2012/0104032 A1 * | 5/2012 | Bahn | | A01K 5/0283 |
| | | | | 222/1 |
| 2013/0226337 A1 * | 8/2013 | Leech | | A63B 47/002 |
| | | | | 700/235 |
| 2013/0331979 A1 | 12/2013 | Koenigsknecht et al. | | |
| 2015/0021352 A1 * | 1/2015 | Kaga | | G06K 5/00 |
| | | | | 221/174 |
| 2015/0144653 A1 * | 5/2015 | Kline | | B67D 1/0888 |
| | | | | 222/1 |
| 2015/0332367 A1 * | 11/2015 | Lozano | | G06Q 30/0621 |
| | | | | 705/26.5 |
| 2016/0098690 A1 * | 4/2016 | Silva | | G06Q 20/18 |
| | | | | 705/21 |
| 2017/0293897 A1 * | 10/2017 | Silva | | G06Q 30/0206 |
| 2017/0349425 A1 * | 12/2017 | Kline | | B67D 1/0888 |
| 2019/0247898 A1 * | 8/2019 | Bertness | | B67D 1/07 |
| 2019/0276237 A1 * | 9/2019 | Koenigsknecht | | A47F 1/02 |
| 2019/0383543 A1 * | 12/2019 | Chandra | | F25D 27/005 |
| 2020/0151678 A1 * | 5/2020 | Silva | | G06Q 30/0206 |
| 2020/0184437 A1 * | 6/2020 | Kelly | | G07F 9/001 |

* cited by examiner

REMOTE HOPPER SYSTEM

TECHNICAL FIELD OF THE INVENTION

The presently disclosed embodiments relate generally to dispensation systems. More particularly, the presently disclosed embodiments relate to a remote hopper system having a hopper connected to a dispensation system and located remote to the dispensation system.

BACKGROUND OF THE INVENTION

Distribution systems are common mechanisms for providing products to a consumer. For example, vending machines have been in existence for decades and allow a consumer to purchase a product, and have that product provided to the consumer, without requiring human interaction. Instead of human interaction, the distribution system can accept payment from the consumer, record the sale, and dispense the product through a mechanical system.

Many distribution systems include hoppers. Hoppers allow a large quantity of products to be stored in one location, and when the distribution system is depleted, new products can be loaded into the hopper to allow for additional transactions. An example of such a hopper-based system can be found in U.S. patent application Ser. No. 13/100,595 (the "'595 application"), the contents of which are incorporated herein in their entirety. In this hopper-based system, products are loaded into a hopper, and when triggered, the system dispenses the products through a series of augers having internal flighting. In the examples provided, the system includes two such augers, and the flighting and other structures of the system increase the chances of distributing only one product through the system each time.

In the system of the '595 application, the hopper is located directly next to the remainder of the dispensation system on the frame holding the augers. In some instances this can cause the hopper to be located in a more valuable area, for example, within an end cap of a grocery store where space is limited.

SUMMARY OF THE INVENTION

The presently disclosed embodiments relate to a dispensation system with a hopper that is located remote to the remainder of the dispensation system. For example, the hopper can be located in one area and a delivery system can be located in another area, with a conveyor or other transmitting device connecting the hopper to the delivery system. In this manner, the hopper can be located in an area that is more accessible or not as "valuable" as the area in which the products or objects are dispensed.

In particular, the presently disclosed embodiments can include a dispensation system having a rack with an upper shelf and a lower shelf located lower than the upper shelf, the rack further having front and rear sides, a hopper for holding objects and located proximate the rear side of the upper rack, a delivery system communicably coupled to the hopper and including an auger with fighting, a delivery chute communicably coupled to the auger such that the objects dispensed from the auger are received in the delivery chute at a receiving end, and the objects are dispensed at a dispensing end opposite the receiving end, the delivery chute dispensing objects to the user at a drop area located proximate a front portion of the lower rack, and a display located proximate the drop area and providing an interface through which a user can communicate with the dispensation system via a smartphone of the user.

The presently disclosed embodiments can further include a dispensation system having a rack with an upper shelf and a lower shelf located lower than the upper shelf, the rack further having front and rear sides and an end side perpendicular to and coupling together the front and rear sides, the end side including legs coupling the upper shelf to the lower shelf, and a hopper for holding objects and located on the rack, a delivery system communicably coupled to the hopper and dispensing objects from the hopper, a delivery chute communicably coupled to the auger such that the objects dispensed from the auger are received in the delivery chute at a receiving end, and the objects are dispensed at a dispensing end opposite the receiving end, the delivery chute dispensing objects to the user at a drop area located proximate a front portion of the lower rack, the delivery chute being aligned adjacent the end side, and a display located proximate the drop area and providing an interface through which a user can communicate with the system via a smartphone of the user.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
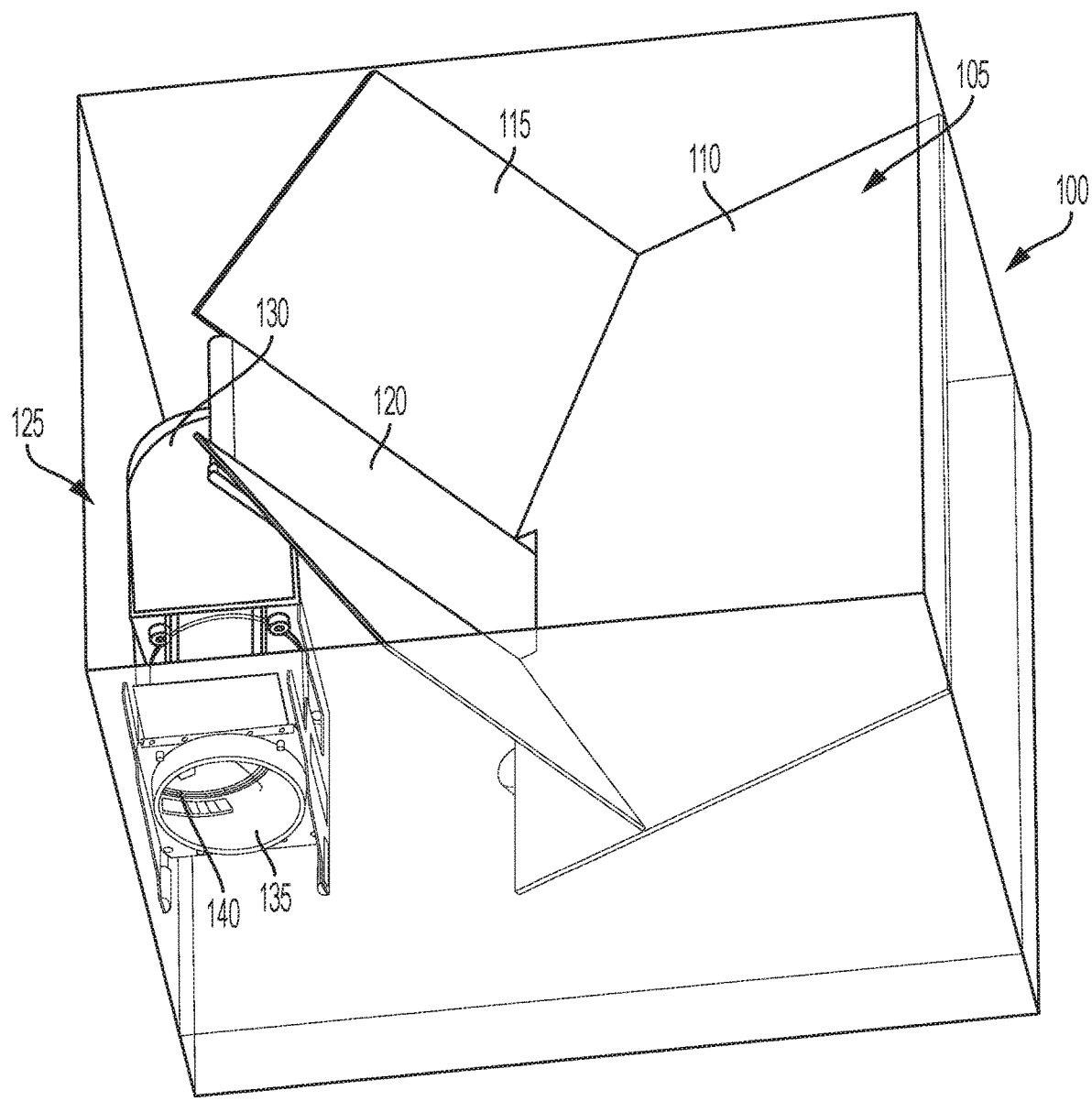
FIG. 1 is a top perspective view of a remote hopper dispensation system according to at least one of the presently disclosed embodiments.
Figure 2:
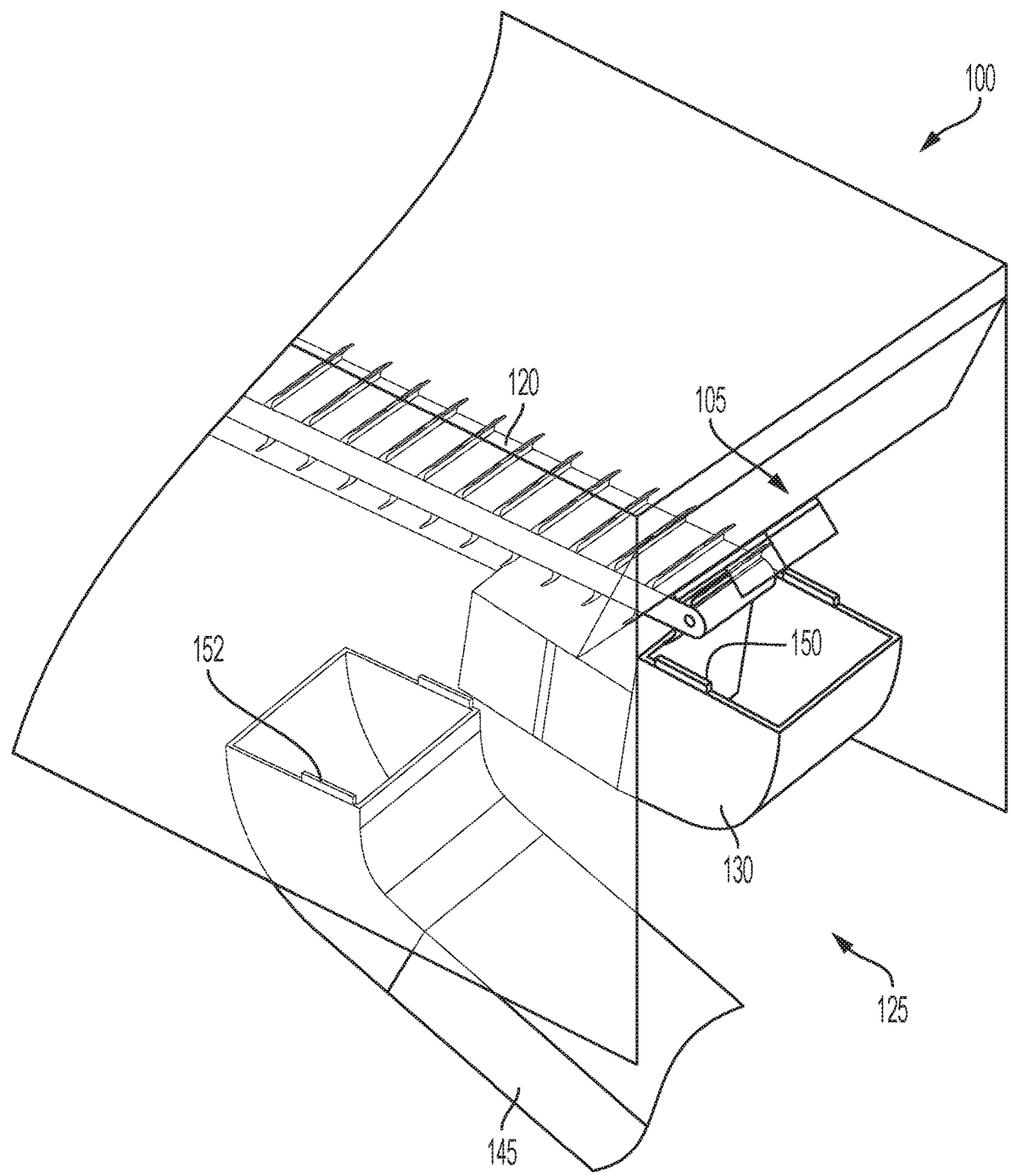
FIG. 2 is a side schematic view of a remote hopper dispensation system according to at least one of the presently disclosed embodiments.
Figure 3:
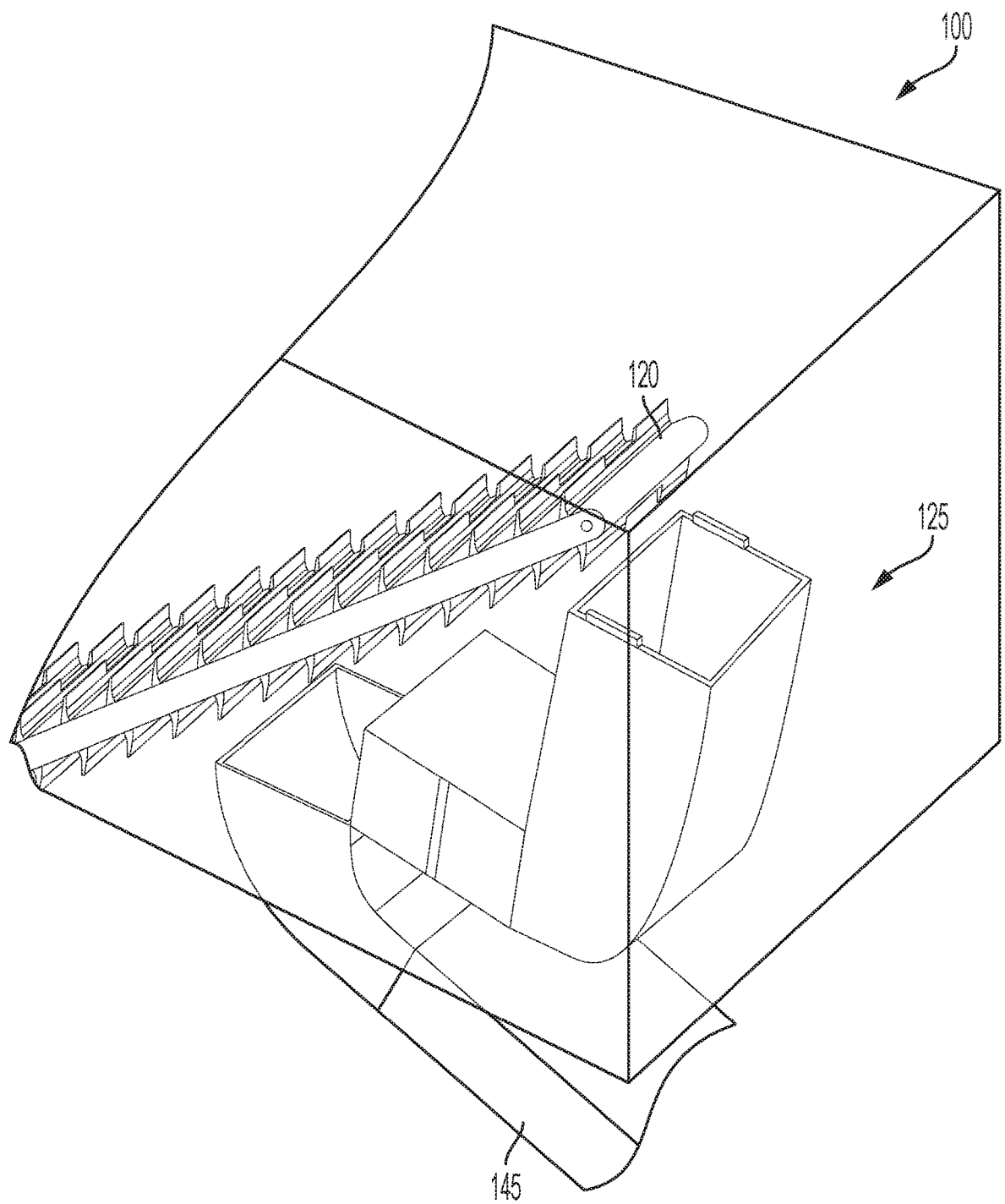
FIG. 3 is a side schematic view of another remote hopper dispensation system according to at least one of the presently disclosed embodiments.
Figure 4B:
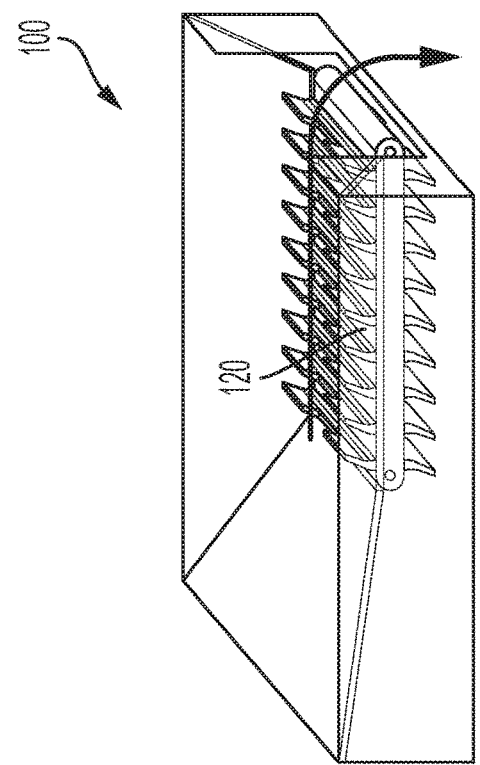
FIG. 4B is a top schematic view of the remote hopper dispensation system illustrated in FIG. 4A according to at least one of the presently disclosed embodiments.
Figure 4A:
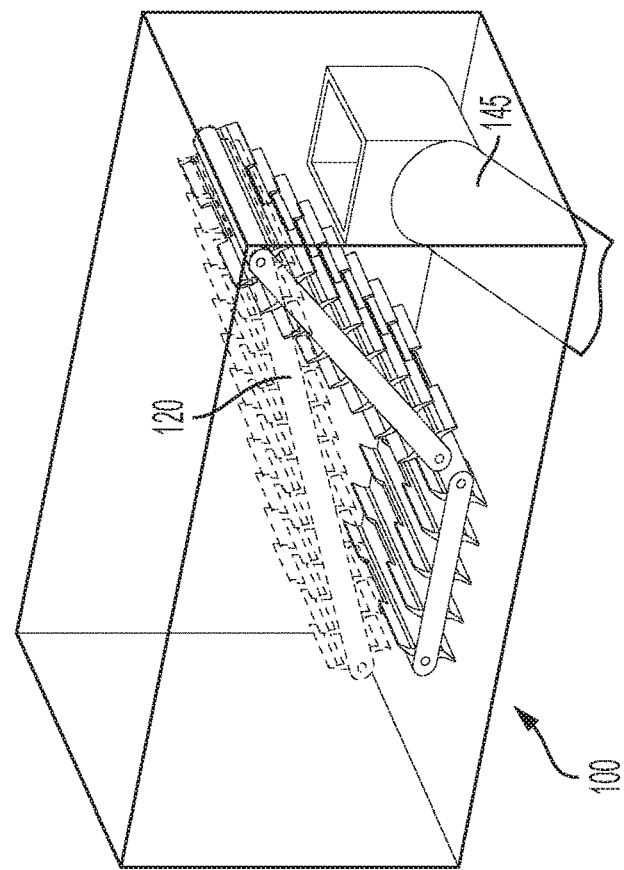
FIG. 4A is a side schematic view of yet another remote hopper dispensation system according to at least one of the presently disclosed embodiments.
Figure 5:
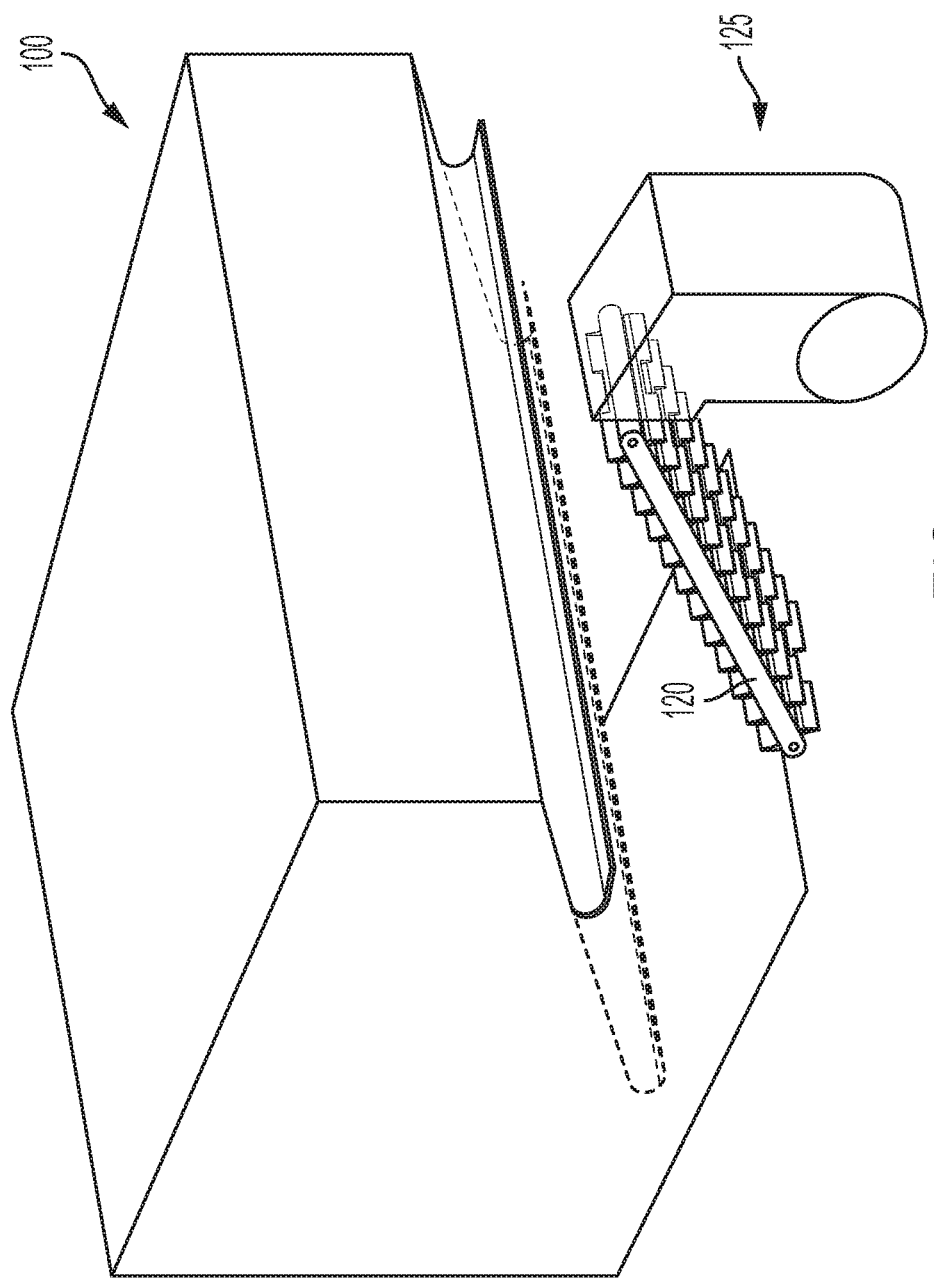
FIG. 5 is a side schematic view of yet another remote hopper dispensation system according to at least one of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments relate to a dispensation system having a hopper. The hopper can be located remote from the remainder of the dispensation system, for example, connected to a delivery system via a conveyor or connected to the drop area via a long chute. The hopper can therefore be located in an area that is more accessible and not as expensive or valuable as the area where the hopper would ordinarily be located.

As shown in FIG. 1, the remote hopper system 100 includes a hopper 105 for holding objects, for example, products to be dispensed. The hopper 105 can include a main face 110 and deflector faces 115 angled with respect to the main face 110 and that direct objects toward a conveyor 120. The conveyor can then provide objects to a delivery system 125 that eventually dispenses the objects to a user. The delivery system 125 can include an elbow 130 that receives the objects and dispenses them to one or more augers 135 having internal fighting 140. The auger 135/flighting 140 combination allows the objects to be dispensed one by one more often than more conventional dispensation systems. For example, the auger 135 can rotate at a rotational speed that is predetermined to improve the chances of the objects being distributed to the user one at a time. The flighting 140 can prevent the objects from falling out of the rotating auger 135 and can separate the objects at the interface between the elbow 130 and the auger 135.

FIGS. 2-5 illustrate various alternative embodiments of the remote hopper system 100. For example, FIG. 2 includes one or more sensors 150, 152 for sensing the objects at various parts of the remote hopper system 100 and in turn determining whether any of the objects are jammed within the system 100. For example, the objects flow from the hopper 105 to the conveyor 120 and then to the delivery system 125 and ultimately down a delivery chute 145. If the object is sensed at the first sensor 150 but is never sensed by the second sensor 152, the system 100 knows the object is jammed somewhere in the delivery system 125. Also in FIG. 2, the conveyor 120 can be located above the delivery system 125 and "drop" the object into the elbow 130 of the delivery system 125 for further distribution to the chute 145. Alternatively, as shown in FIGS. 3, 4A, 4B, and 5, the conveyor 120 can lift the object from a lower point to a higher point and distribute the product into the delivery system 125 in the manner shown.

Figure 6:
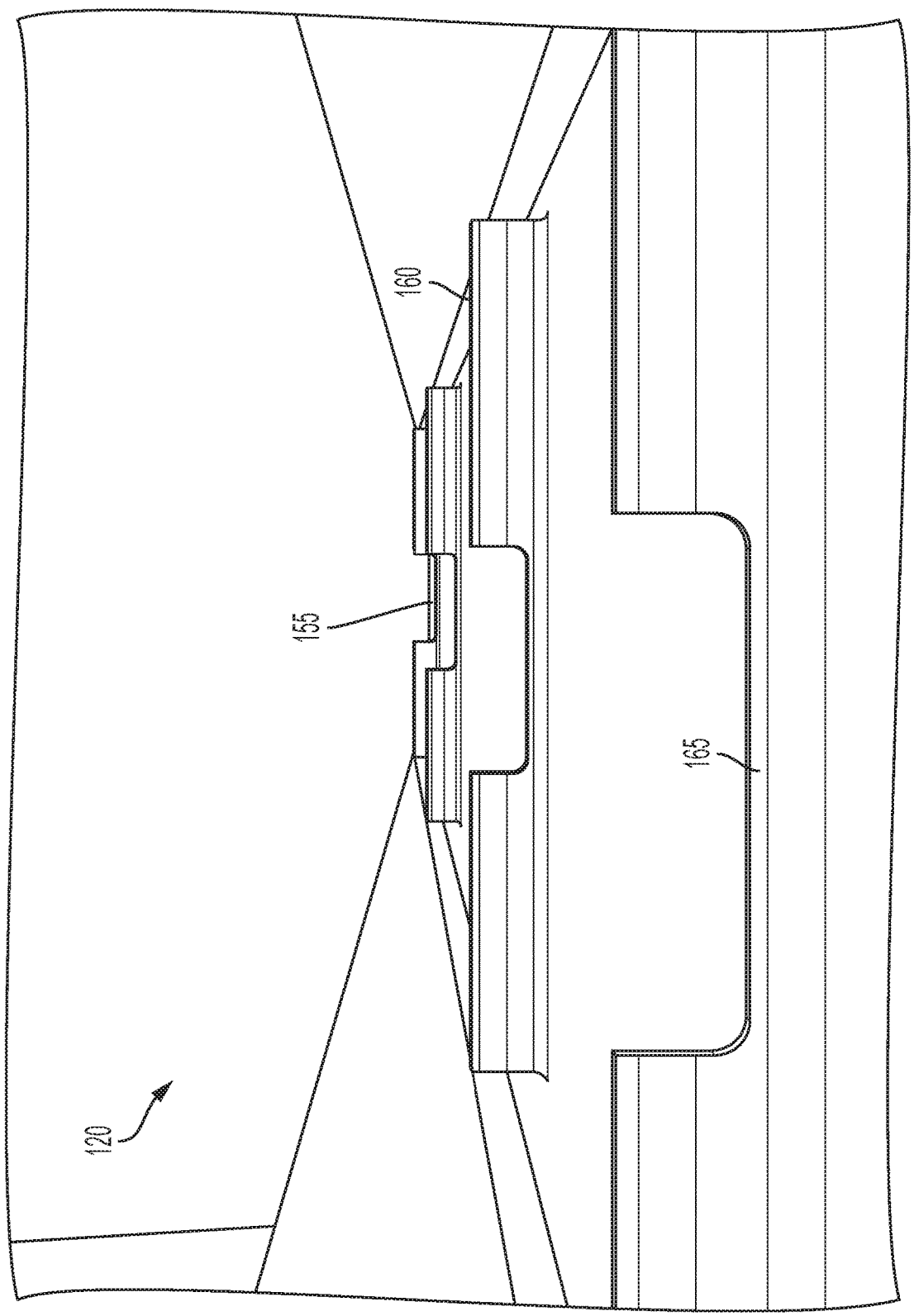
FIG. 6 is a top view of a conveyor according to at least one of the presently disclosed embodiments.
Figure 7:
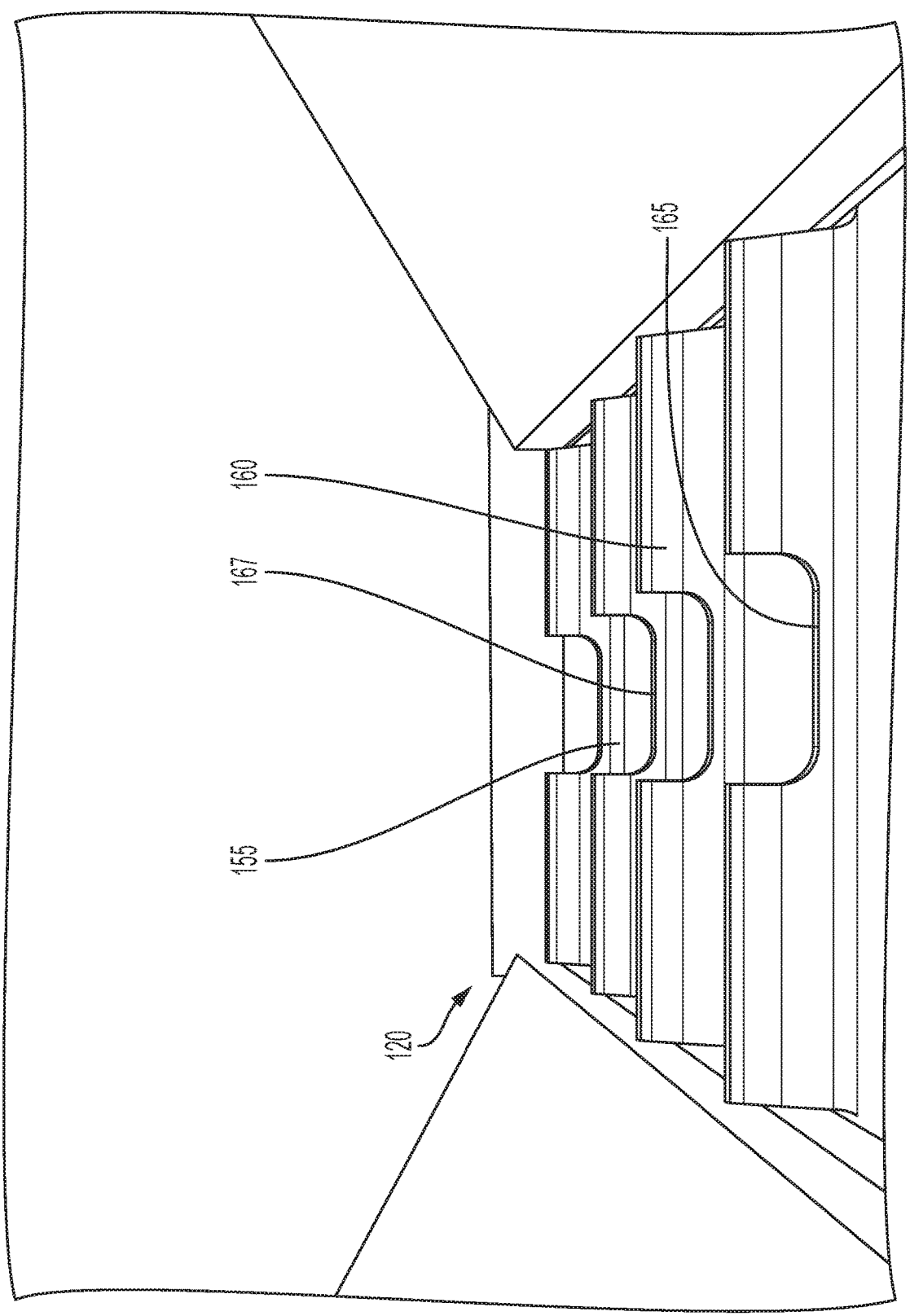
FIG. 7 is a top view of another conveyor according to at least one of the presently disclosed embodiments.
Figure 8:
FIG. 8 is a top perspective view of a conveyor according to at least one of the presently disclosed embodiments.

FIGS. 6-8 illustrate the conveyor 120 in accordance with at least some of the presently disclosed embodiments. The conveyors 120 are shown as conveyor belt-type objects, but the presently disclosed objects are not so limited. A conveyor 120, as that term is used in the presently disclosed embodiments, can include any mechanism that transfers an object from one location to another. As shown, the conveyor 120 can include a belt 155 with conveyor flighting 160 that holds objects to be transferred. The conveyor flighting 160 can be angled upward to better hold the objects, for example, angled at a 60 degree angle. In between the conveyor fighting 160 can be a gap 165 that separates the conveyor flighting 160 into multiple flighting segments. As shown in FIG. 6, the gap 165 can be flush with the belt 155. Alternatively, the gap 165 can be spaced from the belt 155 and a bridge 167 can connect multiple portions of the conveyor flighting 160, as shown in FIG. 7. FIG. 8 illustrates various objects being received by the conveyor 120 and distributed by the conveyor 120.

Figure 9:
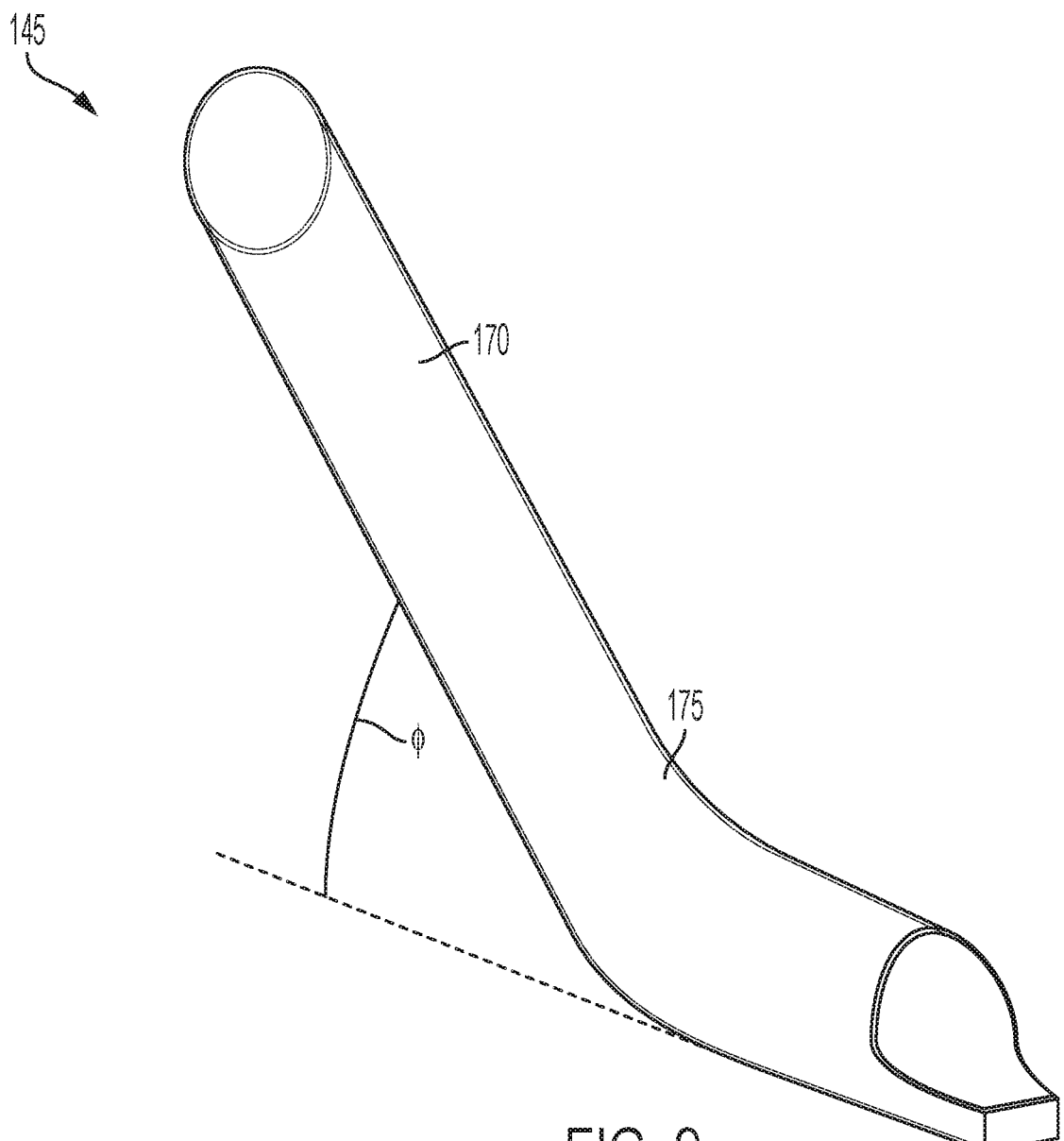
FIG. 9 is a side schematic view of a dispensation chute according to at least one of the presently disclosed embodiments.
Figure 10:
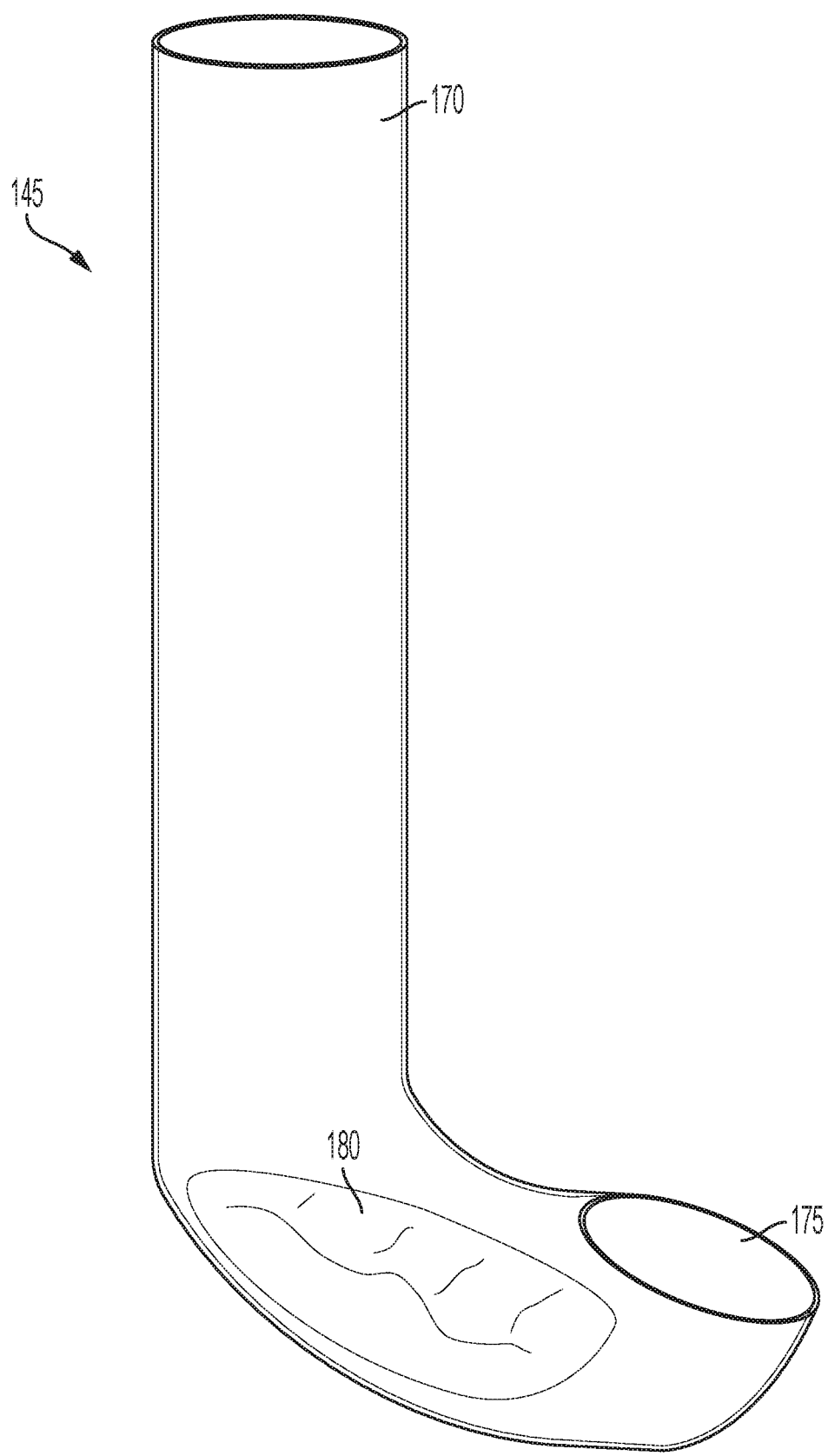
FIG. 10 is side schematic view of another dispensation chute according to at least one of the presently disclosed embodiments.
Figure 11:
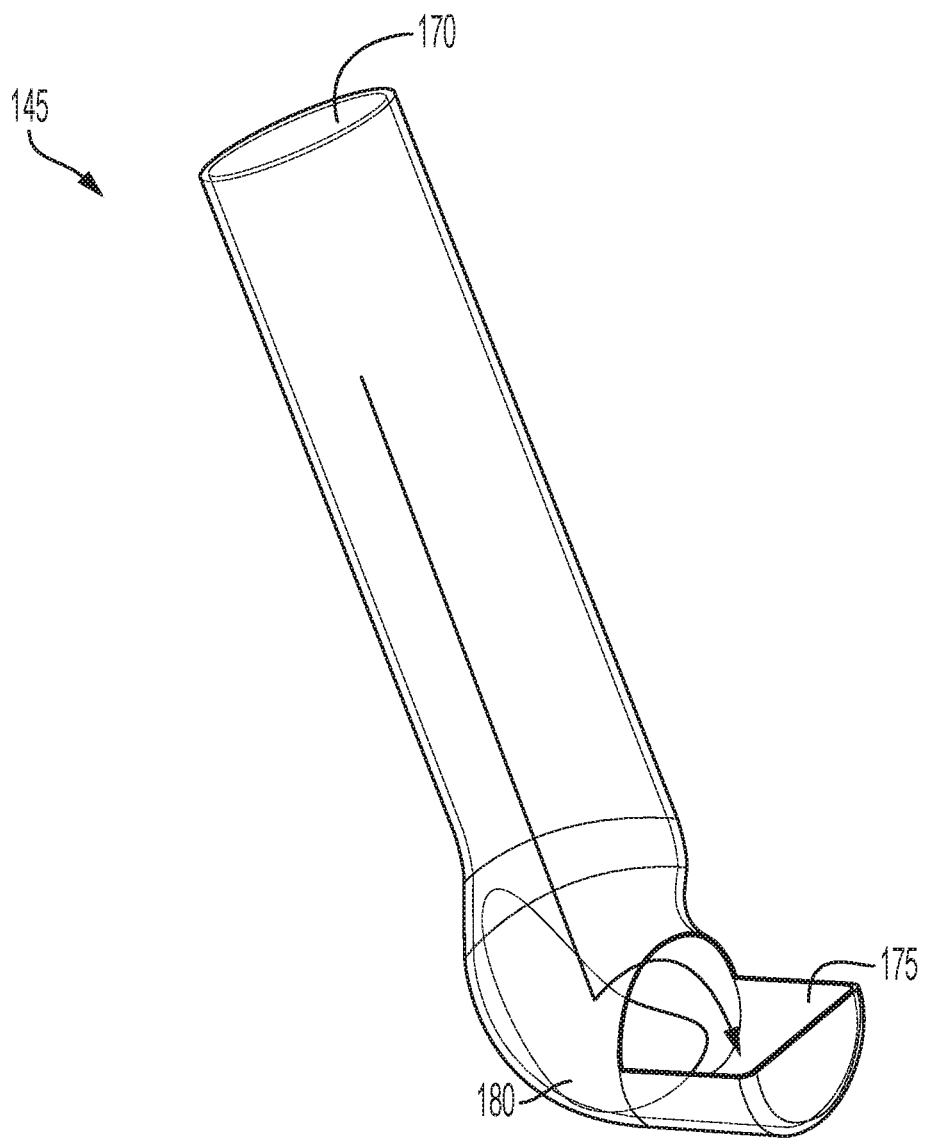
FIG. 11 is side schematic view of yet another dispensation chute according to at least one of the presently disclosed embodiments.

FIGS. 9-11 illustrate various embodiments of a dispensing chute 145 according to at least some of the presently disclosed embodiments. Typically, although not always, the dispensing chute 145 can be located toward the end of the delivery system 125 and can dispense objects to a user. As shown in FIG. 9, the dispensing chute 145 can include a receiving end 170 that receives objects, and a dispensing end 175 that dispenses objects to a user. The dispensing chute 145 of FIG. 9 is angled and the various angles of the dispensing chute 145 can depend on the objects being dispensed. The dispensing chute 145 of FIG. 10 can be referred to as the "egg drop" dispensing chute 145. As shown, the dispensing chute 145 of FIG. 10 can include a pad 180 proximate the dispensing end 175 of the chute. Objects can enter through the receiving end 170 and land on the pad 180, thereby reducing the speed at which they are moving, and subsequently can be presented to the user at or near the dispensing end 175. Alternatively, as shown in FIG. 11, a "slow and present" type dispensing chute 145 can allow objects to enter though the receiving end 170 and bounce off the pad 180 before being presented at or near the dispensing end 175.

FIGS. 12, 13, 14, 15, 16A, and 16B illustrate various remote hopper systems 100 according to at least some of the presently disclosed embodiments. As shown, the system 100 of FIG. 12 includes a display 185 that presents instructions to a user, advertisements for a product being dispensed, or any other form of information that may be helpful to the remote hopper system 100. For example, the display 185 can present a barcode, such as a quick response code, also known as a "QR Code," and the user can then interact with the system 100 on his or her smart phone based on the location linked to by the QR code. Alternatively, the system 100 can include a scanner 190 that can be located within the remote hopper system 100, for example, to scan a card, barcode, or other object that may identify the user who is using the system 100 and to trigger the dispensation of an object from the system 100.

Figure 12:
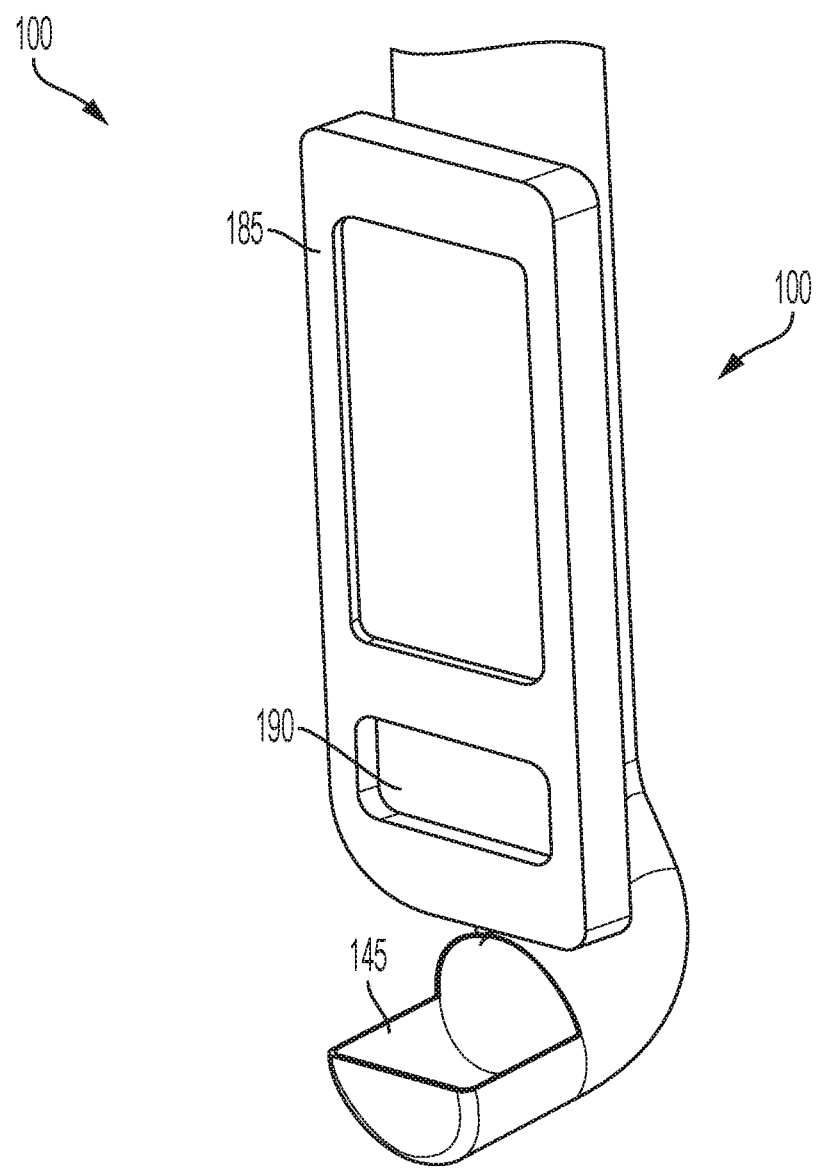
FIG. 12 is a side perspective view of a dispensation system with a dispensing chute in a first position according to at least one of the presently disclosed embodiments.
Figure 13:
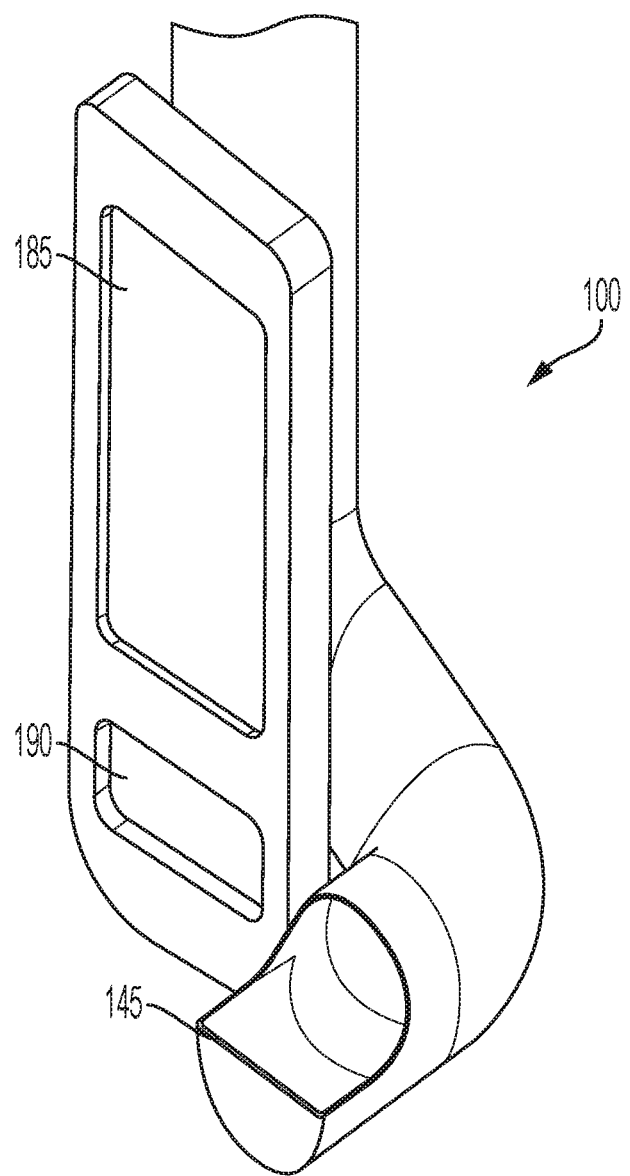
FIG. 13 is a side perspective view of a dispensation system with a dispensing chute in a second position according to at least one of the presently disclosed embodiments.
Figure 14:
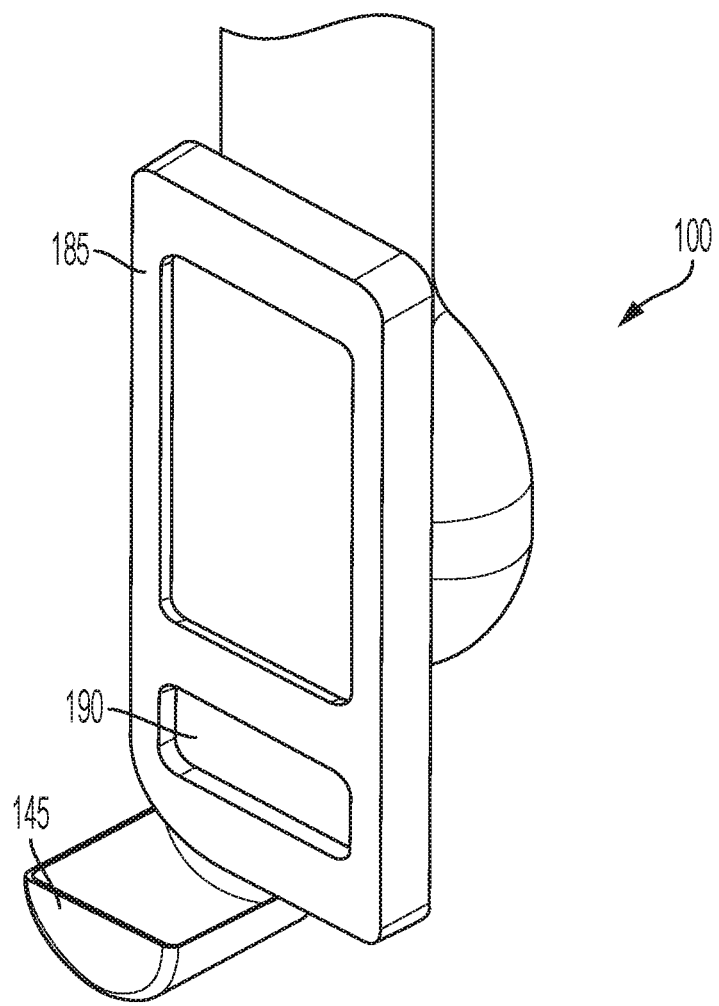
FIG. 14 is a side perspective view of a dispensation system with a dispensing chute in a third position according to at least one of the presently disclosed embodiments.
Figure 15:
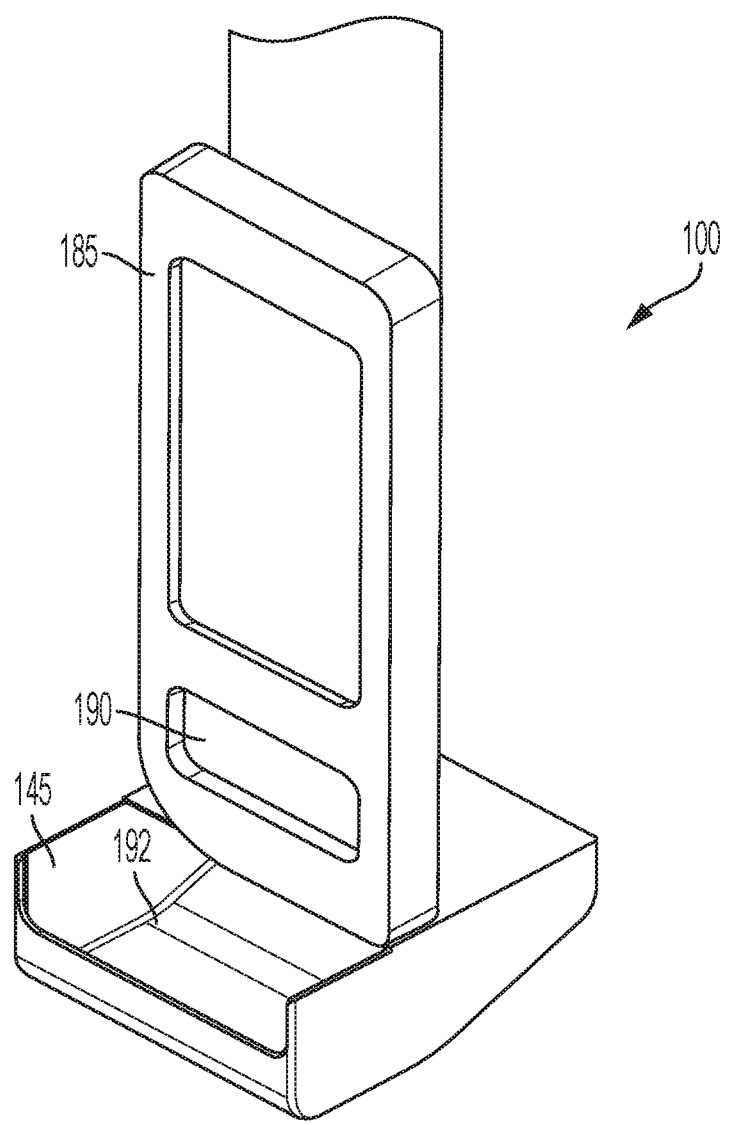
FIG. 15 is a side perspective view of a dispensation system with another dispensing chute according to at least one of the presently disclosed embodiments.
Figure 16B:
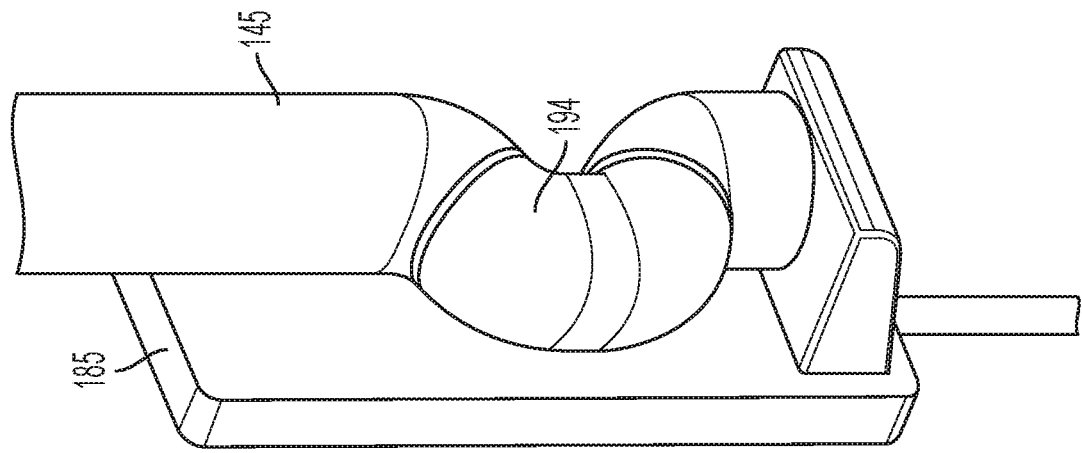
FIG. 16B is a rear perspective view of a dispensation system illustrated in FIG. 16A according to at least one of the presently disclosed embodiments.
Figure 16A:
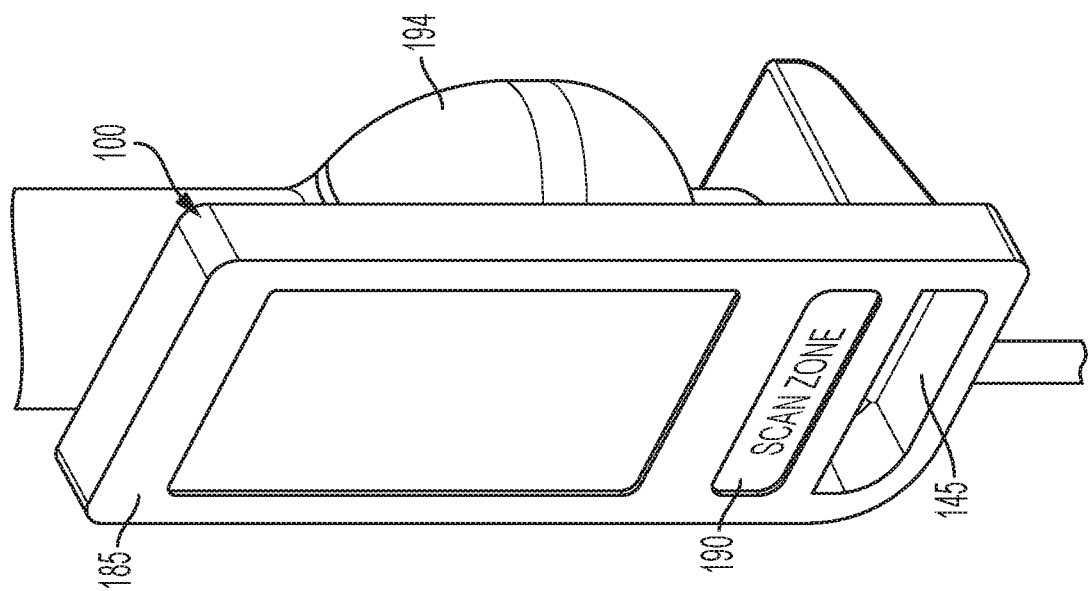
FIG. 16A is a side perspective view of a dispensation system with an integrated dispensing chute according to at least one of the presently disclosed embodiments.
Figure 17:
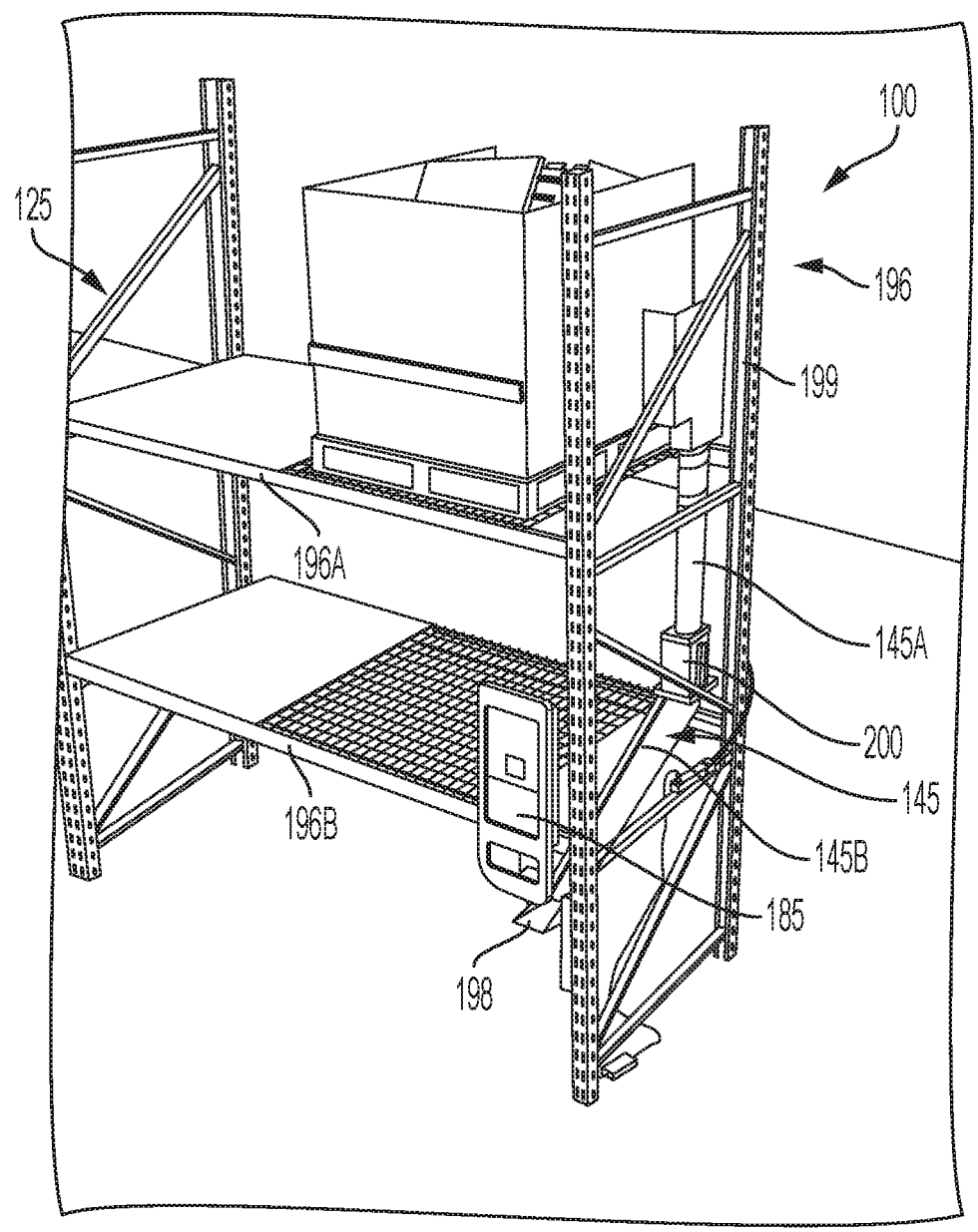
FIG. 17 is a front perspective view of a remote hopper system according to at least one of the presently disclosed embodiments.

As shown in FIGS. 12-16B, the dispensing chute 145 can be located in various different locations on the system 100. For example, as shown in FIG. 12, the dispensing chute can be located at the bottom of the system 100 and provide objects to users below the scanner 190 and display 185. As shown in FIG. 13, the dispensing chute can be located along the side of the system 100 next to the display. Still alternatively, as shown in FIG. 14, a hybrid solution is disclosed where the dispensing chute 145 is located below and to the side of the display 185 and scanner 190. FIG. 15 illustrates a tray-like dispensing chute 145 where objects can be presented to the user similar to an automated teller machine (ATM) or other such device. Here, the dispensing chute 145 includes a tray 192 that receives the objects from the chute, similar to the egg-drop (FIG. 10) or slow and present (FIG. 11) embodiments discussed above. FIGS. 16A and 16B illustrate yet another embodiment where the dispensing chute 145 is integral with the remainder of the system 100, but where the dispensing chute 145 can include a bend 194 that slows the movement of the object.

FIGS. 17-20 illustrate another of the presently disclosed embodiments where the display 185 or barcode is located on the customer-facing side of a rack 196, and the delivery system 125 is located remotely from the display 185. For example, the delivery system 125 can include the hopper 105 and one or more augers 135 having internal flighting 140, as discussed above with regard to other embodiments. The rack 196 can include an upper shelf 196A and a lower shelf 196B that is lower than the upper shelf 196A. The delivery system 125 can be located proximate, although not necessarily on, the upper shelf 196A; and the display 185 can be located proximate, although not necessarily on, the lower shelf 196B. The delivery system 125 can further be locate toward a rear (non-customer facing) portion of the rack 196 and the display 185 located on a front (customer facing) portion of the rack 196. Still further, the delivery system 125 can be directly connected to an area near the display 185 where the objects are ultimately dispensed, termed a drop area 198, by the dispensing chute 145. In this manner, the components of the system 100 can be distributed more efficiently such that the display 185 can be located near the customer in the more valuable space in the store, and the delivery system 125 can be located in less valuable space but still communicably coupled to the display 185. The dispensing chute 145 can connect the delivery system 125 to the drop area 198 where the user can retrieve the object. In some embodiments, the drop area 198 is a part of the dispensing chute 145 itself, e.g., located proximate the dispensing end 175 of the dispensing chute 145. In an embodiment, the drop area 198 is located proximate the display 185 to allow the user to easily locate the object when distributed.

The dispensing chute 145 can be separated into two or more segments that allows more efficient spatial use of the rack 196 and avoids unnecessarily consuming space along the rack 196 that is more valuable to the store. For example, the dispensing chute 145 can include first 145A and second 145B segments. The first segment 145A can dispense objects at a steeper angle as compared to the second segment 145B. In this manner, the first segment 145A can more closely align with an end side of the rack 196 (i.e., the side connecting the front and rear sides of the rack 196) and allow the flatter second segment 145B to then align with the horizontal components of the rack 196, for example, the lower shelf 196B. The dispensing chute 145 can also be aligned adjacent the legs 199 of the rack 196 for similar spatial reasons, i.e., to avoid consuming valuable space in the middle of the rack 196 and to instead align the dispensing chute 145 with the legs 199 that are already extending upward. The segments 145A, 145B can be connected by a joint 200.

Figure 18:
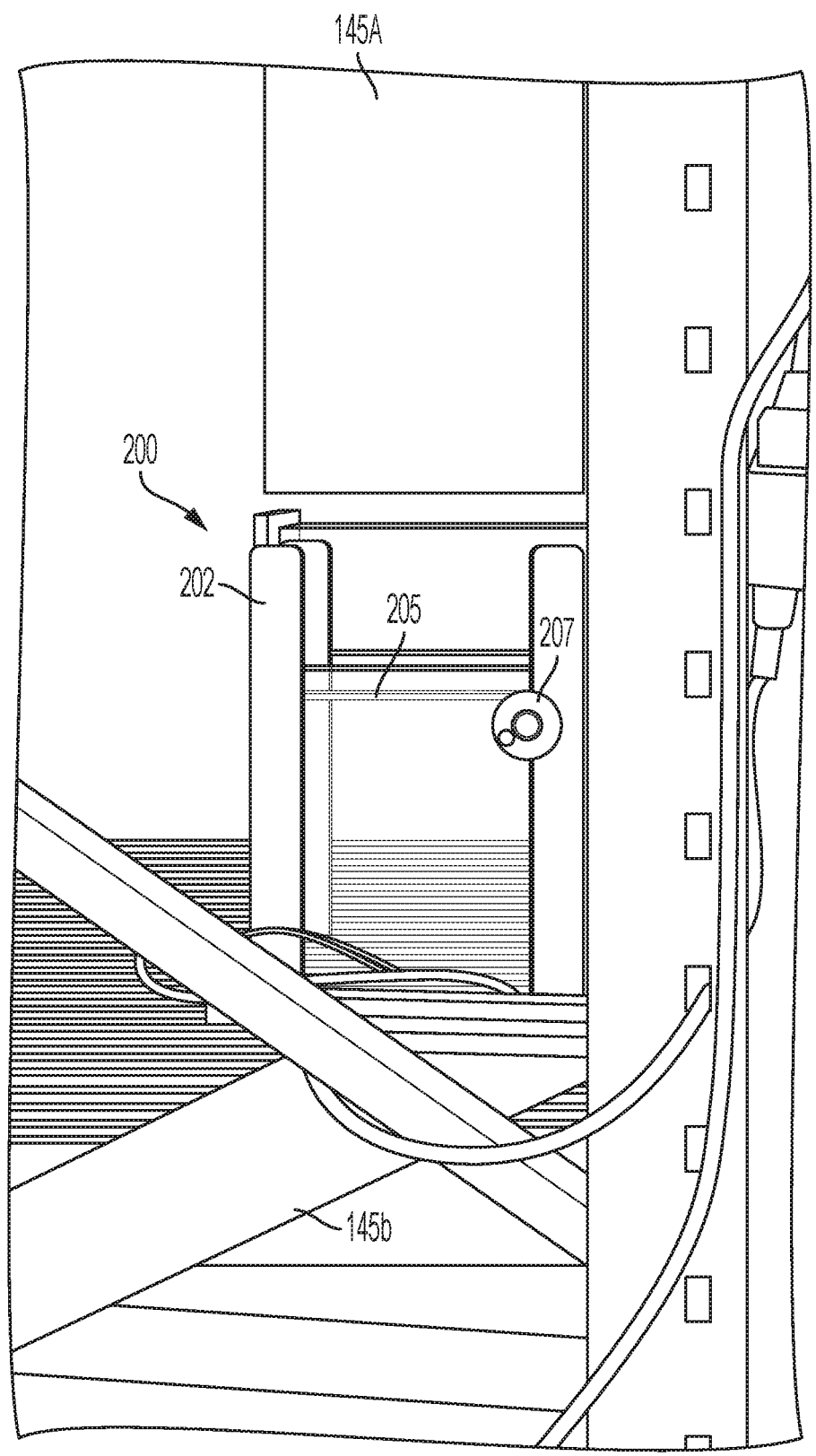
FIG. 18 is a side view of a dispensation system with no product dispensed according to at least one of the presently disclosed embodiments.
Figure 19:
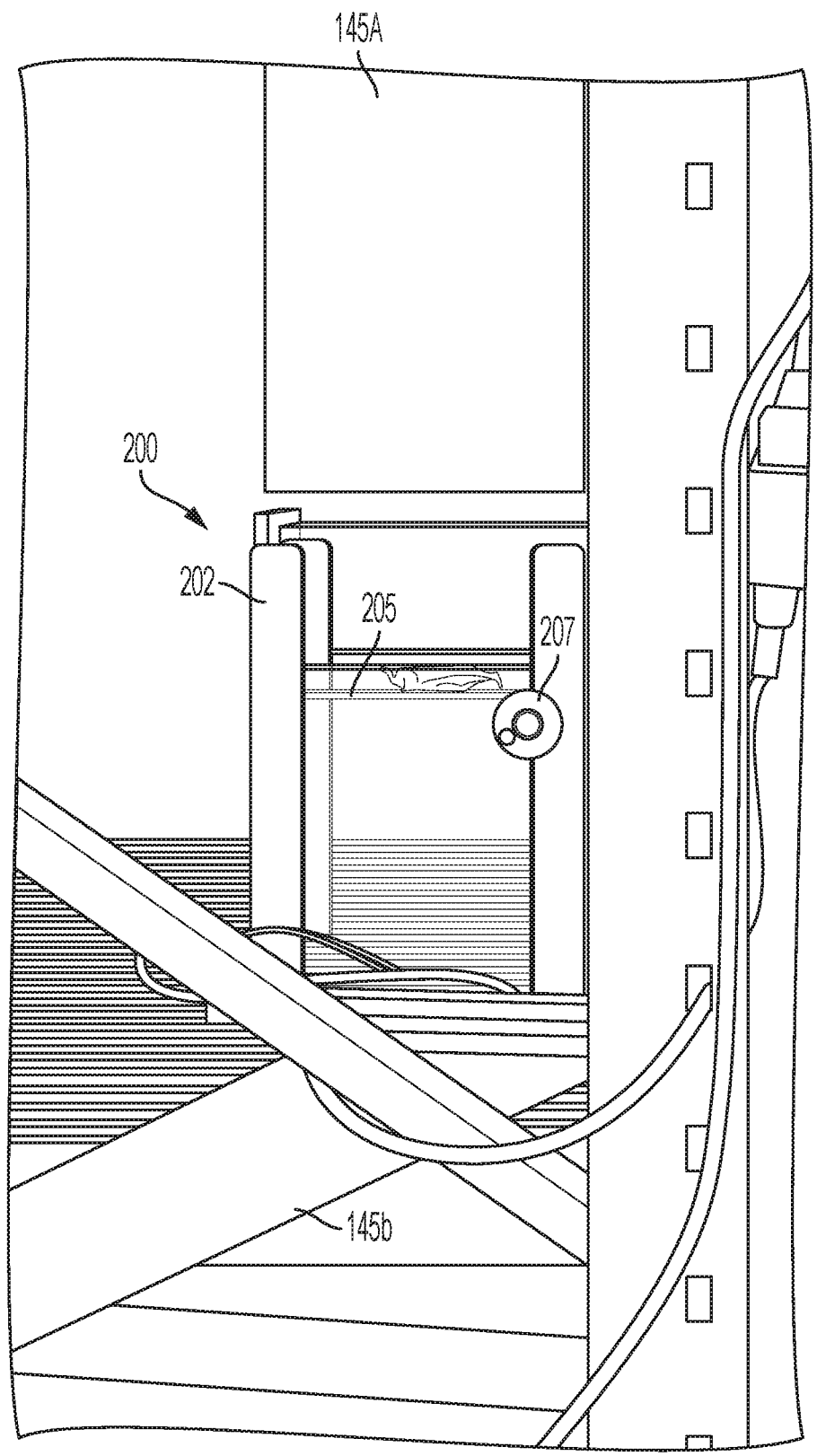
FIG. 19 is a side view of a dispensation system with a product disposed in the resting position according to at least one of the presently disclosed embodiments.
Figure 20:
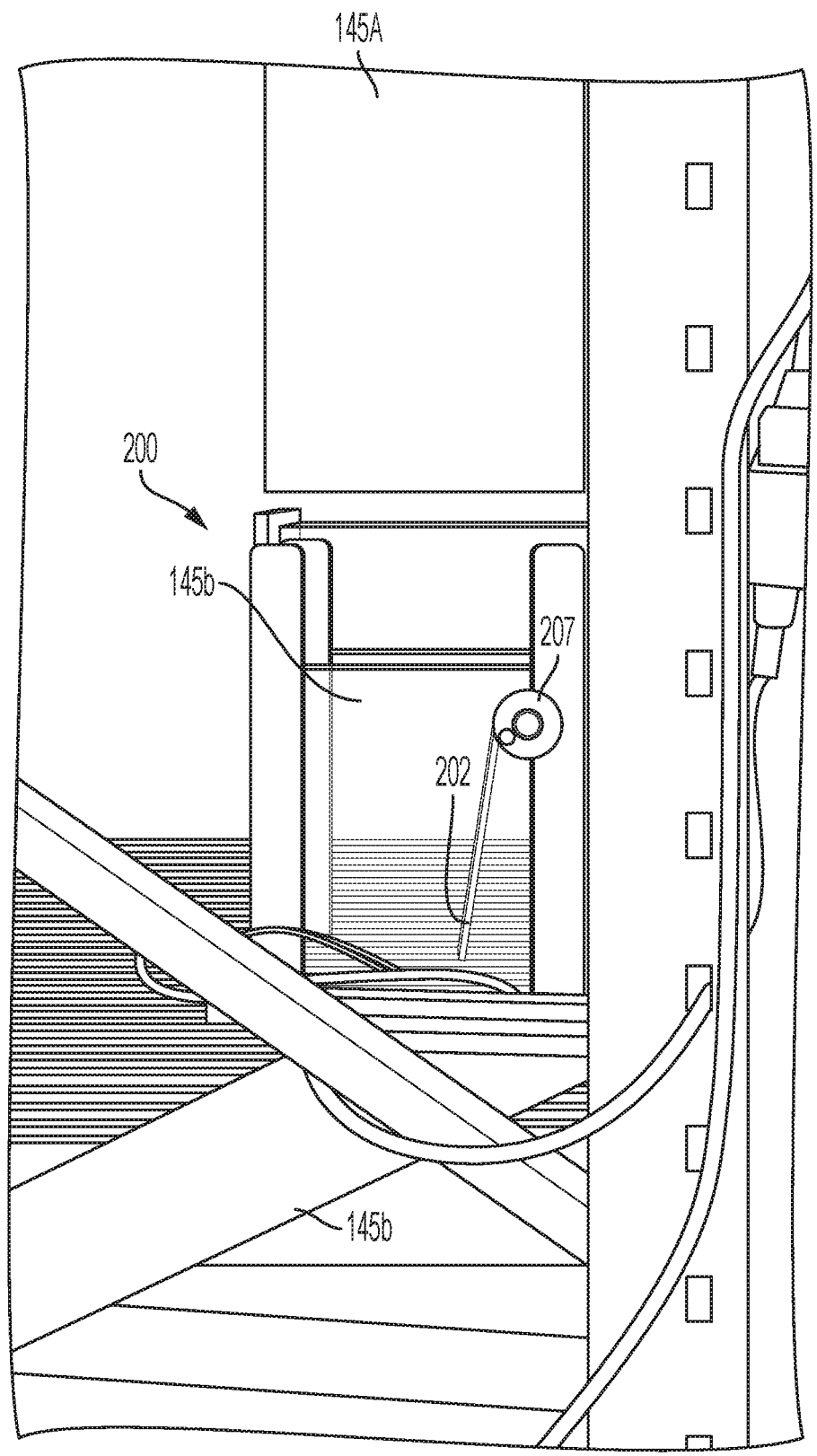
FIG. 20 is a side view of a joint between first and second dispensing chute segments according to at least one of the presently disclosed embodiments.

FIGS. 18-20 illustrate the joint 200 according to at least some of the presently disclosed embodiments. As shown, the joint provides a temporary resting place for the object before it is ultimately dispensed to the user via the second segment 145B. As shown in FIG. 18, the joint 200 can include a housing 202 and a platform 205 that is hingedly coupled to the housing 202 at a hinge 207. In FIG. 19 an object has fallen from the first segment 145A of the dispensing chute 145 onto the platform 205. In FIG. 20 the platform 205 has rotated about the hinge 207 to allow the object to fall to the second segment 145B and eventually to the drop area 198 for user retrieval.

As discussed herein, the display 185 can be a conventional display with a scanner for scanning a barcode such as a QR code. Alternatively, the display 185 can be an image, for example a bar code or more particularly a QR code, that the user can scan with the user's smart phone. Upon scanning the QR code, the user can then interact with his or her smart phone to cause the system 100 to dispense an object and to communicate the user's information to the system 100. For example, by scanning the QR code on the smart phone, the user can send to the system a unique identifier identifying the user, and a signal instructing the system 100 to distribute an object. The system 100 can then interact with a database associated with a commercial enterprise to determine whether the user purchased a product corresponding to the object from the commercial enterprise. For example, the system 100 can be located in a retail store and provide free samples, and the system 100 can communicate with a database of the retail store to determine whether the user purchased the product associated with the free sample based on the unique identifier associated with the user and communicated to the system 100.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims and the following claims when viewed in their proper perspective based on the prior art.

What is claimed is:

1. A dispensation system comprising:
   a rack having an upper shelf and a lower shelf located lower than the upper shelf, the rack further having front and rear sides;
   a hopper for holding objects and located proximate the rear side of the upper shelf;
   a delivery system communicably coupled to the hopper and including an auger with fighting;
   a delivery chute communicably coupled to the auger, the auger dispensing objects to the delivery chute at a receiving end, the objects being transferred down a first segment of the delivery chute extending along the rear side of the upper and lower shelves perpendicular to the upper shelf, and the objects being dispensed at a dispensing end of the delivery chute opposite the receiving end, the delivery chute dispensing objects at a drop area located proximate the front side of the lower shelf, accessible to a user; and a display located proximate the drop area and providing an interface through which the user can communicate with the dispensation system via a smartphone of the user.

2. The dispensation system of claim 1, further comprising a conveyor communicably coupled to the hopper and to the delivery system, the conveyor delivering objects from the hopper to the delivery system.

3. The dispensation system of claim 1, wherein the conveyor includes a conveyor belt and conveyor flighting extending at an angle to the conveyor belt.

4. The dispensation system of claim 3, wherein the conveyor flighting includes a gap that separates the conveyor flighting into multiple flighting segments.

5. The dispensation system of claim 4, wherein the gap is spaced from the conveyor belt and wherein the conveyor further includes a bridge coupling the flighting segments together.

6. The dispensation system of claim 2, further comprising an elbow that receives objects from the conveyor and delivers the objects to the delivery system.

7. The dispensation system of claim 1, wherein the display is a bar code that can be scanned by a smart phone so as to allow communication between the smart phone and the dispensation system.

8. The dispensation system of claim 1, wherein the delivery chute includes the first segment extending at a first angle from the delivery system, and a second segment that extends from the first segment at a second angle, the second angle being steeper than the first angle.

9. The dispensation system of claim 8, further comprising a joint coupling the first segment to the second segment, the joint including a housing having a rotatable platform disposed therein, the first segment of the delivery chute delivering at least one of the objects to the platform and the platform being rotatable about a hinge to allow the object to be dispensed into the second segment of the delivery chute.

10. The dispensation system of claim 1, wherein the rack includes legs on an end side perpendicular to the front and rear sides, and wherein the delivery chute is aligned adjacent to the legs.

11. A dispensation system comprising:
a rack having an upper shelf and a lower shelf located lower than the upper shelf, the rack further having front and rear sides and an end side perpendicular to and coupling together the front and rear sides, the end side including legs coupling the upper shelf to the lower shelf;

a hopper for holding objects and located on the rack;

a delivery system communicably coupled to the hopper and dispensing objects from the hopper;

a delivery chute communicably coupled to an auger, the auger dispensing objects to the delivery chute at a receiving end, the objects being transferred down a first segment of the delivery chute extending along the rear side of the upper and lower shelves perpendicular to the upper shelf, and the objects being dispensed at a dispensing end opposite the receiving end, the delivery chute dispensing objects to the user at a drop area located proximate the front side of the lower shelf, the delivery chute being aligned adjacent the end side; and a display located proximate the drop area and providing an interface through which a user can communicate with the system via a smartphone of the user.

12. The dispensation system of claim 11, further comprising a conveyor communicably coupled to the hopper and to the delivery system, the conveyor delivering objects from the hopper to the delivery system.

13. The dispensation system of claim 11, wherein the conveyor includes a conveyor belt and conveyor flighting extending at an angle to the conveyor belt.

14. The dispensation system of claim 13, wherein the conveyor flighting includes a gap that separates the conveyor flighting into multiple flighting segments.

15. The dispensation system of claim 14, wherein the gap is spaced from the conveyor belt and wherein the conveyor further includes a bridge coupling the flighting segments together.

16. The dispensation system of claim 12, further comprising an elbow that receives objects from the conveyor and delivers the objects to the delivery system.

17. The dispensation system of claim 11, wherein the display is a bar code that can be scanned by a smart phone so as to allow communication between the smart phone and the system.

18. The dispensation system of claim 11, wherein the delivery chute includes the first segment extending at a first angle from the delivery system, and a second segment that extends from the first segment at a second angle, the second angle being steeper than the first angle.

19. The dispensation system of claim 18, further comprising a joint coupling the first segment to the second segment, the joint including a housing having a rotatable platform disposed therein, the first segment of the delivery chute delivering at least one of the objects to the platform and the platform being rotatable about a hinge to allow the object to be dispensed into the second segment of the delivery chute.

20. The dispensation system of claim 11, wherein the delivery system includes the auger having internal flighting therein.

* * * * *